United States Patent [19]

Fénart

[11] 4,132,120
[45] Jan. 2, 1979

[54] DIAPHRAGM ENGAGEMENT MEANS FOR EXPANSIBLE PULLEY

[75] Inventor: Jean-Claude Fénart, Fourqueux (Yvelines), France

[73] Assignee: Societe Anonyme Francaise du Ferodo, Paris, France

[21] Appl. No.: 783,427

[22] Filed: Mar. 31, 1977

[30] Foreign Application Priority Data

Apr. 9, 1976 [FR] France .................................. 76 10392

[51] Int. Cl.² ...................... F16H 55/52; F16H 55/56
[52] U.S. Cl. ......................... 74/230.17 A; 74/230.17 E
[58] Field of Search .............. 74/230.17 A, 230.17 E, 74/230.17 R, 230.3; 403/372; 267/53, 161, 162

[56] References Cited

U.S. PATENT DOCUMENTS

| | | |
|---|---|---|
| 2,310,081 | 2/1943 | Hill ................................ 74/230.17 E |
| 2,630,897 | 12/1961 | Steinlein ............................. 267/161 |
| 3,013,792 | 3/1961 | Porter ................................ 267/161 |
| 3,727,476 | 4/1973 | Heidorn ........................ 74/230.17 E |
| 3,808,900 | 5/1974 | Vadeboncoeur et al. .... 74/230.17 E |
| 3,906,808 | 9/1975 | Zaiser et al. .................. 74/230.17 E |
| 4,020,711 | 5/1977 | Woolard ....................... 74/230.17 A |

FOREIGN PATENT DOCUMENTS

| | | | |
|---|---|---|---|
| 2535513 | 8/1975 | Fed. Rep. of Germany .... 74/230.17 E |
| 1245954 | 10/1960 | France ................................... 267/161 |
| 1283024 | 12/1961 | France ................................... 267/161 |
| 2060836 | 6/1971 | France ................................... 267/161 |
| 778,403 | 7/1957 | United Kingdom .............. 74/230.17 E |

Primary Examiner—Samuel Scott
Assistant Examiner—William R. Henderson
Attorney, Agent, or Firm—Charles E. Brown

[57] ABSTRACT

A speed change pulley has a fixed side plate and a movable side plate, with resilient means urging the movable side plate towards the fixed side plate, to vary the width of a belt-receiving V groove therebetween. The resilient means comprises a resilient diaphragm engaged with the movable side plate by at least one engagement member which is formed separately from the diaphragm and suitably mounted thereon, and engaged in a complementary opening at the periphery of the movable side plate.

26 Claims, 25 Drawing Figures

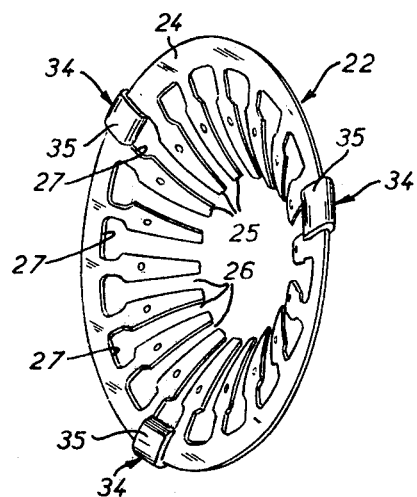
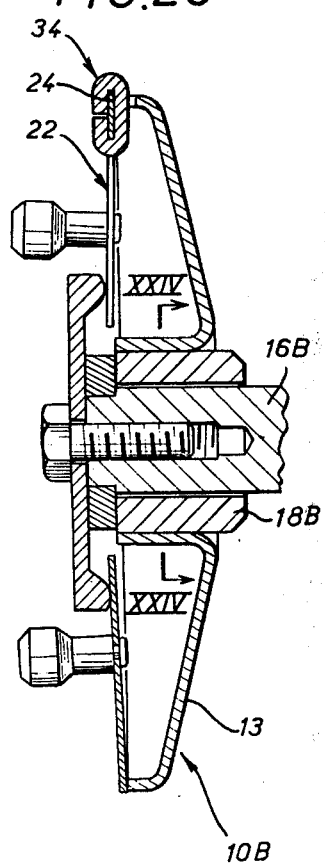
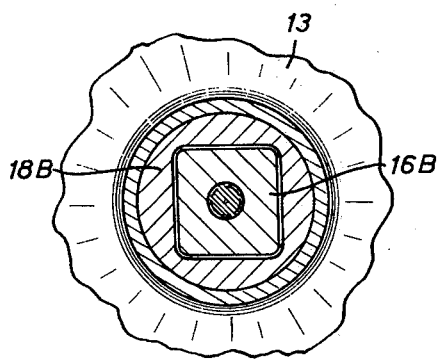

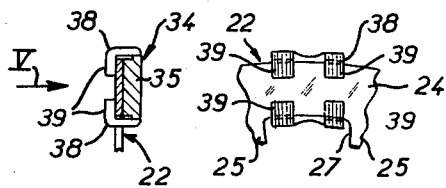
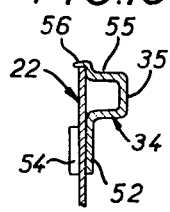
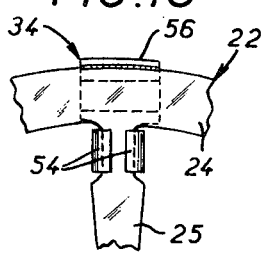
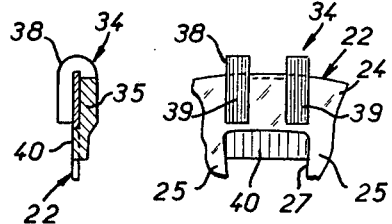
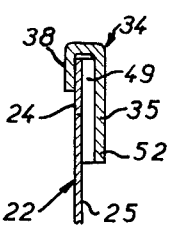
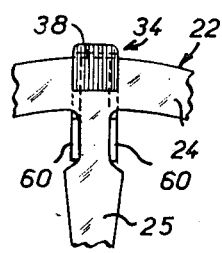
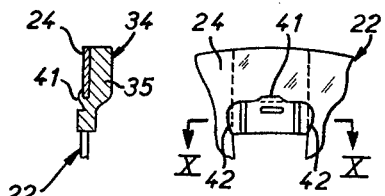
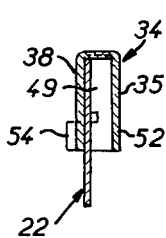
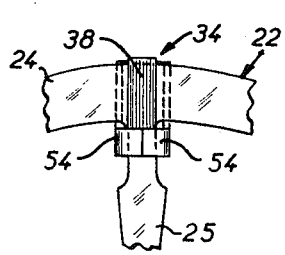
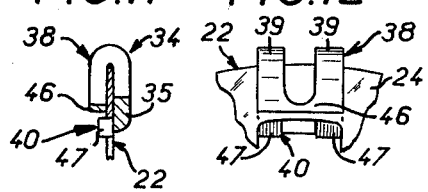
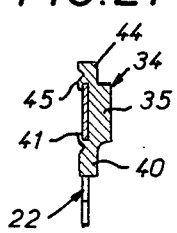
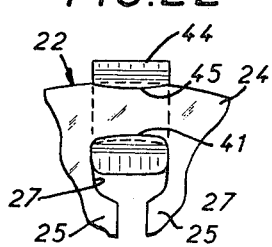
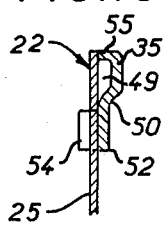
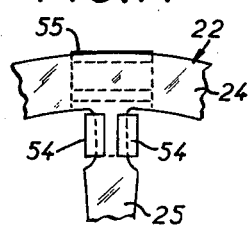

DIAPHRAGM ENGAGEMENT MEANS FOR EXPANSIBLE PULLEY

BACKGROUND OF THE INVENTION

Belt-type speed change units or variable transmission units are known, for the controlled driving of any appropriate member from a suitable drive means. For example, such a device may be used in a motor vehicle for driving, from the engine thereof, any auxiliary device, such as an alternator, water pump or fan.

Such a speed change device may comprise two pulleys, each comprising oppositely disposed side plates which are arranged coaxially with each other and one of which is fixed and the other of which is movable relative thereto by resilient return means. The side plates each have frustoconically extending portions defining a tapered groove, and the belt sits within said tapered groove so that when the movable side plate of one pulley moves towards the associated fixed side plate, the belt is urged radially outwardly relative to that pulley, riding radially outwardly on the inclined side faces of the groove. Conversely, the belt is displaced radially inwardly on the other pulley, being so permitted by the movable side plate of that pulley moving axially away from the fixed side plate, thus increasing the width between the inclined side faces of the groove of that pulley.

Various forms of such a device are known, but in some such devices the resilient return means associated with the movable side plate is formed by an annular member, usually referred to as a diaphragm. The diaphragm has a peripherally extending carrier portion which forms a Belleville washer-like arrangement and which bears against the movable side plate, and a central portion which is divided by radially extending slots into a plurality of radially extending fingers which bear against an abutment member, the abutment member is axially fitted with respect to the fixed side plate of the pulley.

One of the difficulties encountered in such a construction is that it is necessary to provide additional engagement means between the movable side plate and the diaphragm acting therein, either to provide for suitable centering of the diaphragm relative to the associated movable side plate or for also rotationally driving the side plate by means of the diaphragm. For example, such engagement means may comprise lugs which project radially from the diaphragm, around the edge of the above-mentioned peripheral portion and in continuity therewith, the lugs co-operating with complementary apertures or recesses provided for that purpose in the movable side plate.

However, such an arrangement suffers from a double disadvantage. Firstly, it requires a highly disadvantageous local modification in the annular form of the peripheral portion of the diaphragm, the disadvantage in this respect being that it is precisely this part of the diaphragm which is required to operate under substantial stresses, insofar as the peripheral portion has a spring-like action, in the manner of a Belleville washer. This local change in the peripheral portion of the diaphragm is inevitably likely to impair the operating performance and moreover its length of service life. It is in fact not uncommon to find in service that fracture lines and similar rupture beginnings occur on the peripheral portion of the diaphragm, for example extending radially thereacross, and such feature lines originate in the region of the angle along which the peripheral portion is connected to the lug which extends radially from the peripheral portion.

In addition, for a given diaphragm diameter, the above-mentioned lugs which radial extensions on the peripheral portion of the diaphragm will necessarily reduce the working diameter of the peripheral portion, in comparison with a diaphragm of the same overall diameter but without any radial lugs.

In another known construction, the engagement means operatively disposed between the movable side plate and the diaphragm are in the form of axially extending lugs or stubs fixed on the movable plate and engaged between the radially extending fingers of the diaphragm, thereby to co-operate with the circumferentially facing edges thereof. However, in this construction, contact between the engagement lugs or stubs and the radially extending fingers of the diaphragm is at a radial location thereof at which the axial displacement of the fingers relative to the movable plate is of a relatively substantial extent, in speed-changing operation of the pulley. This inevitably results in rapid wear at the positions where the fingers of the diaphragm bear against the lugs or stubs, and this results in the increasing development of a not inconsiderable amount of clearance between the fingers and the lugs or stubs, such clearance thus resulting in an increased amount of operating noise. In addition, besides the above-mentioned clearance, this construction also suffers from the disadvantages of considerable friction between the fingers and the lugs or stubs, which prevents free axial sliding movement of the movable side plate.

SUMMARY OF THE INVENTION

An object of the present invention is generally to overcome the above-mentioned disadvantages.

A further object of the invention is to provide an improved belttype speed change pulley comprising two coaxially opposite-disposed side plates, each with inclined side surfaces, one side plate being movable relative to the other which is fixed, such movement being effected by means of resilient engagement means in the form of a diaphragm.

Another object of the invention is to provide an improved device in which the diaphragm is engaged with the movable side plate so as to provide for a relative centering action.

Yet another object of the invention is to provide a device in which the engagement between the diaphragm and the movable side plate provides for centering therebetween but also for the transmission of drive between the diaphragm and the movable side plate.

Still another object of the invention is to provide a speed change pulley having a diaphragm with a peripheral portion acting as a Belleville washer-like structure, which does not require local modification in the peripheral portion, likely to reduce the working strength thereof.

A still further object of the invention is to provide a speed change pulley which can provide for good dynamic balancing of the assembly.

These and other objects are achieved according to the invention by a pulley comprising two coaxial side plates defining a frustoconicalsection belt-receiving groove. One plate is axially fixed and the other is axially movable to vary the groove width, under the control of a resilient return means in the form of a diaphragm. The diaphragm has a resilient, Belleville-washer-like peripheral portion, and a plurality of generally radially inwardly projecting fingers which bear against an axially fixed abutment. The diaphragm carries at least one engagement block member which is made as a component separate from the diaphragm and attached thereto. Each block member is engaged in a receiving means of the movable side plate, thus to centre the diaphragm and the movable side plate relative to each other. The block member may also serve to transmit rotary drive from the diaphragm to the side plate.

BRIEF DESCRIPTION OF THE DRAWINGS

FIG. 3 is a perspective view of the diaphragm of the FIG. 1 pulley, as viewed in the direction of arrow III in FIG. 1;

FIG. 4 is an axial cross-sectional view showing a detail of a second embodiment of the pulley;

FIG. 5 is a plan view of part of the FIG. 4 pulley as viewed in the direction of arrow V in FIG. 4;

FIGS. 6 and 7 are views corresponding to those of FIGS. 4 and 5, showing part of a third embodiment of the pulley;

FIGS. 8 and 9 are views corresponding to those of FIGS. 4 and 5 showing a fourth embodiment of the pulley;

FIG. 10 is a cross-sectional view of part of the embodiment shown partly in FIGS. 8 and 9, in section taken along line X—X in FIG. 9;

FIGS. 11 and 12, 13 and 14, 15 and 16, 17 and 18, 19 and 20, and 21 and 22 are views respectively similar to those of FIGS. 4 and 5, showing further embodiments;

FIG. 23 is an axial cross-sectional view similar to FIG. 1 showing part of yet another embodiment;

FIG. 24 is a transverse sectional view of the FIG. 23 embodiment, in section along line XXIV—XXIV in FIG. 23.

DESCRIPTION OF THE PREFERRED EMBODIMENTS

For a more complete appreciation of the present invention, attention is invited to the accompanying drawings which show at least parts of a number of embodiments of the speed change or variable transmission-ratio pulley of the present invention.

Figure 1:
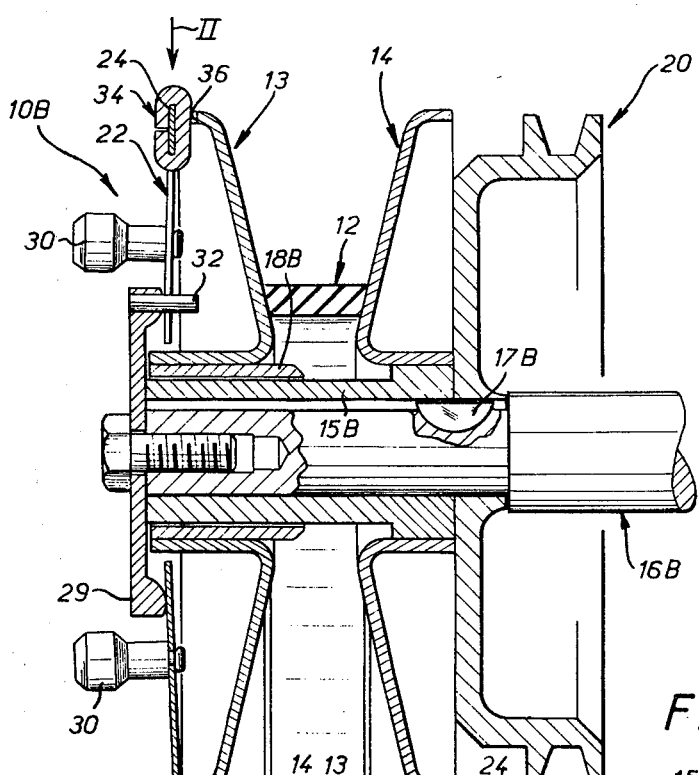
FIG. 1 is an axial cross-sectional view of one embodiment of a belt-type transmission device with speed change or variable transmission pulleys of the invention.

Referring firstly to FIG. 1, a speed change device shown therein comprises a drive pulley 10A, a driven pulley 10B and an endless belt 12 looped around the pulleys.

Each of the pulleys 10A and 10B comprises two oppositely and coaxially disposed side plates 13 and 14 each of which has an inclined side surface as shown, thereby defining between them a belt-receiving groove of generally frustoconical configuration. The plate 13 is a movable plate which is mounted for axial movement relative to the fixed plate 14, the plate 13 being subject to actuation by resilient return means.

Figure 1A:
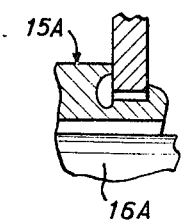
FIG. 1A shows the detail part of FIG. 1 indicated at A, on a larger scale.
Figure 2:
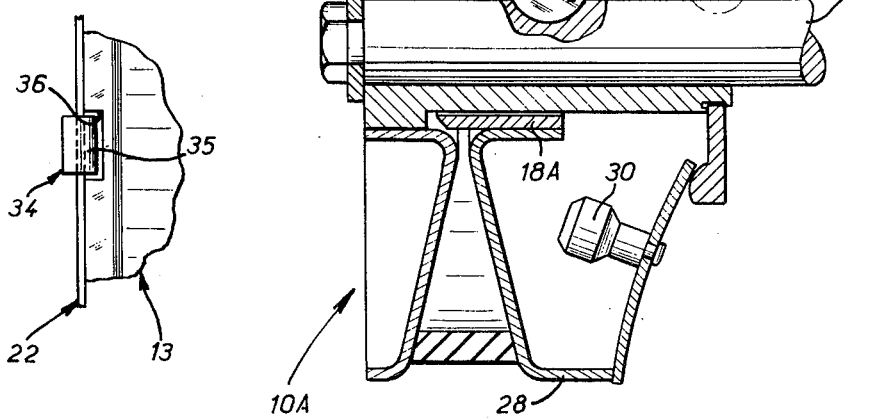
FIG. 2 is a plan view of part of a pulley of the FIG. 1 device, as viewed in the direction as indicated by arrow II in FIG. 1.

In FIG. 1, the fixed plate 14 of the drive pulley 10A is fixed in any suitable manner, as by welding, brazing, adhesive or pressfitting, radially on a sleeve 15A adjacent one end thereof (see also FIG. 1A). The sleeve 15A is carried on a drive shaft 16A which serves to support and drive the pulley 10A insofar as the sleeve 15A is fixed in rotation to the shaft 16A by a key 17A and is also axially fixed in any suitable manner (not shown) on the shaft.

The movable plate 13 of the drive pulley 10A is carried by a support member in the form of a bushing 18A which is slidably mounted on the sleeve 15A and on which the plate 13 is fixed in any suitable manner.

The driven pulley 10B is generally of a similar construction to the pulley 10A, and thus comprises a fixed plate 14 carried fixedly by a sleeve 15B fixed against rotation on a support shaft 16B by a key 17B. The side plate 14 is thus also fixed against axial movement on the shaft.

The movable plate 13 of the pulley 10B is carried by a support member in the form of a bushing 18B slidably mounted on the sleeve 15B.

In the FIG. 1 embodiment, a pulley 20 with a peripheral groove is also fixed on the shaft 16B of the driven pulley 10B. The pulley 20 forms the output member of the speed change device, whose input member is the shaft 16A.

Such an arrangement is known per se and, not being part of the present invention, will not be described in greater detail hereinafter.

Referring now again to FIGS. 1 and 1A, the above-mentioned resilient return means acting on the movable plate 13 acts to urge the movable plate 13 axially towards the associated fixed plate 14. Such resilient means comprises an annular member 22 (see FIG. 3), usually referred to, and so referred to hereinafter, as a diaphragm. The diaphragm 22 is shown separately in FIG. 3, and comprises a peripheral portion 24 which forms a resilient washer structure of a Belleville washer type, and a central portion which is divided into a plurality of radially extending fingers 25 by radially extending slots 26. At the base of each of the fingers 25, where they join the peripheral portion 24, the slots 26 are enlarged in a circumferential direction to form apertures 27. In the rest condition of the diaphragm 22, the fingers 25 assume a position in which they extend in a conical configuration axially away from the peripheral portion 24 of the diaphragm. The conically inclined condition of the diaphragm is clearly visible in FIG. 3 and also in the lower part of FIG. 1, on the drive pulley 10A.

At its peripheral portion 24, the diaphragm 22 bears against the movable plate 13, more specifically against an axially extending annular portion or rim 28 at the periphery of the movable plate 13. The free, radially inward ends of the fingers 25 of the diaphragm 22 bear against an abutment member 29 which is axially fixed relative to the fixed plate 14. Thus, as shown in FIG. 1, the member 29 of the drive pulley 10A is carried radially by the sleeve 15A, at the end of the sleeve 15A remote from the fixed plate 14. The member 29 may be fixed on the sleeve 15A by a spline-like arrangement which will thus prevent rotary movement between the sleeve 15A and the member 29. The member 29 is advantageously of a harder material than the material of the sleeve 15A and its inwardly facing peripheral surface is provided with a tooth-like configuration which machines or forms the grooves of the above-mentioned spline-like arrangement on the peripheral surface of the reduced-diameter end portion of the sleeve 15A, as clearly shown in FIG. 1A, when the member 29 is fitted with a press fit onto said reduced-diameter end portion. Ahead of the member 29, the above-mentioned peripheral surface of the reduced-diameter portion has a groove (not referenced) provided to receive the material removed from the sleeve 15A by the machining action of the tooth-like configuration on the member 29 as it is force-fitted onto the sleeve. The adjacent axial end of the above-mentioned reduced-diameter portion of the sleeve is flattened or burred over after the member 29 has been fitted, to locate the member 29 axially on the sleeve 15A.

The corresponding annular member 29 of the pulley 10B is simply engaged against the end of the sleeve 15B, being secured and clamped thereto by a bolt screw-threaded into the shaft 16B at the left-hand thereof. It will be appreciated however that the member 29 of the pulley 10B could also be fitted in position and held thereon by a spline-type arrangement as described above in relation to the pulley 10A.

In the embodiment shown, each pulley diaphragm 22 also provides, besides the above-mentioned resilient return means, which are responsive to centrifugal force generated by rotation of the pulley, and for this purpose, and to increase the sensitivity to such centrifugal force, at least some of the fingers 25 each carry a small weight member 30 as shown in FIG. 1.

Each diaphragm 22 is provided with engagement means co-operable with complementary openings or recesses provided for that purpose at the axially directed free edge of the rim 28 of the respective movable plate 13. Said engagement means must be capable in particular of providing for suitable centering of the diaphragm 22 with respect to the associated movable plate 13.

In the embodiments shown in FIGS. 1 to 22, such engagement means are also capable of providing for the transmission of rotary drive between the movable side plate 13 and the diaphragm 22. It will be noted that the diaphragm itself is fixed in rotation relative to the respective sleeve 15A, 15B by means of pins 32 which are carried by and project axially from the corresponding member 29. Each pin 32 is engaged between two fingers 25 of the diaphragm, thus engaging into the respective slot 26.

Reverting now to the above-mentioned engagement means, such comprises at least one engagement or entrainment member of block 34, in this description referred to as a block, which is formed as a component separate from the diaphragm and suitably mounted thereon.

Generally, and as shown particularly clearly in FIG. 3, the diaphragm 22 will carry a plurality of such engagement blocks, there being three as shown, which are uniformly distributed around the periphery of the diaphragm. Such blocks may advantageously be employed also to achieve dynamic balancing of the diaphragm assembly.

Each such engagement block 34 generally comprises a plate or body portion 35 which projects across the peripheral portion 24 of the diaphragm, on the face thereof which is towards the movable plate 13 in the embodiment illustrated. The portion 35 will usually extend radially completely across the peripheral portion 24, co-operating with and extending through a complementary opening 36 provided for that purpose in the rim 28 of the movable plate 13. The block 34 will thus be immovable relative to the portion 24 in the circumferential direction thereof.

Various means can be used for suitably fixing each engagement block 34 to the diaphragm 22. In the embodiment shown in FIGS. 1 to 3, the portion 35 is extended around the outside peripheral edge and the inside peripheral edge of the portion 24, by means of two claws or lugs 38 which engage around the respective edges of the portion 24 to hook-like engage against the face of the portion 24 remote from the portion 35. The portion 38 which turns around the inside peripheral edge of the portion 24 passes through the respective opening 27. It will be seen therefore that the portions 38 ensure that the block 34 is locally gripped on the portion 24, in radial alignment with a respective one of the slots 27.

In the alternative embodiment shown in FIGS. 4 and 5, the portions 38 of the block 34 are each divided into two radially extending fingers 39.

In the structure shown in FIGS. 6 and 7, the portion 35 of block 34 is extended around the outer peripheral edge of the portion 24 of the diaphragm 22, by means of a lug or hook portion 38 which is turned radially around said edge. The portion 38 is divided into two fingers 39 (FIG. 7). However, along the inside peripheral edge of the portion 24, the portion 35 carries a radial extension 40 which is simply force-fitted between two adjacent fingers 25, engaging into the slot 26 between such fingers.

In the embodiment in FIGS. 8 through 10, a radial extension, similar to that shown at 40 in FIGS. 6 and 7, is sufficient, on its own, to hold the block 34 to the diaphragm 22. For this purpose, the extension 40 is gripped as by crimping onto the opposite face of the portion 24; the extension 40 is crimped at its radially outward edge 41 and at its circumferentially facing ends 42, the resulting deformed portions at 41 and 42 produced by the above-mentioned crimping operation holding the block in place. The radially outer edge of portion 35 is substantially level with the outer peripheral edge of the portion 24.

In the embodiment of FIGS. 11 and 12, the portion 35 of the block 34 is radially extended, around the outer peripheral edge of the portion 24, by a hook-shaped lug 38 which is divided into fingers 39 (FIG. 12), as in the embodiment of FIGS. 6 and 7. At their free radially inwardly directed ends however, the fingers 39 are interconnected by a bridge portion 46 which therefore extends in a circumferential direction between the fingers, being made in one piece therewith. In addition, in this embodiment, along the inner peripheral edge of the portion 24, the portion 35 carries a radial extension 40 which is a force-fit in a slot 27 in the diaphragm, as in the embodiment of FIGS. 6 and 7, but in FIGS. 11 and 12 radial extension 40 is divided into two studs or projections 47.

It will be appreciated that in the above-described embodiments, each engagement block 34 is fitted in radial alignment with a slot 26 in the diaphragm 22, and its plate or body portion 35, which is relatively thick, has its whole radial length applied to the adjacent face of the peripheral portion 24 of the diaphragm. Where the portion 35 is referred to above as being relatively thick, this is intended to mean that the thickness of the portion 35 is at least twice the thickness of the peripheral portion 24 of the diaphragm.

In the embodiments shown in FIGS. 13 through 20, the block 34 extends generally in radial alignment with the root or base portion of a finger 25, that is to say, at the position where the finger 25 joins the peripheral portion 24. The plate or body portion 35 of such a block is relatively thin and at least a portion of its radially extending dimension is spaced from the adjacent face of the peripheral portion 24. The portion 35 has bent edge or angle portions 49 which extend perpendicularly to the portion 35 along the circumferentially facing edges thereof and which bear against the peripheral portion 24. Where reference is made above to the portion 35 being relatively thin, this is intended to mean that the thickness of the portion 35 is at most twice the thickness of the portion 24.

In the embodiment shown in FIGS. 13 and 14, the portion 35 of the block 34 comprises a radial extension 52 disposed along the inner peripheral edge of the portion 24. The extension 52 extends beyond an angle-bent portion 50 clearly shown in FIG. 13 and is in contact with the root or base portion of a finger 25. At its edges which extend radially, thus facing in the circumferential directions of the diaphragm, the extension 52 has lugs 54 which are turned in a hook-like configuration and are directed towards each other around the adjacent edges of the above-mentioned root or base portion of the finger. This arrangement is clearly visible in FIG. 14.

Along the outer peripheral edge of the peripheral portion 24, the plate portion 35 also has an angle-bent or return portion 55 which is at right angles to the main body part of the portion 35 and which bears against the adjacent face of the portion 24. The portion 55 is substantially level with the outer peripheral edge of the portion 24.

In an alternative form as shown in FIGS. 15 and 16, the portion 55 is displaced slightly radially inwardly from the outer peripheral edge of the portion 24 and itself has an extension 56 which extends as a right-angle bent portion to bear radially inwardly against the outer peripheral edge of the portion 24.

In the alternative embodiment shown in FIGS. 17 and 18, the portion 35 is extended radially around the outer peripheral edge of the portion 24, by a lug or claw 38 which is turned in a hook-like configuration about said edge, thus to bear against the opposite face of the portion 24, similarly to the embodiment described above and shown in FIGS. 1 through 3.

In addition, in the FIGS. 17 and 18 structure, the radial extension 52 of the portion 35 is level with the main body part of the portion 35, as shown in FIG. 15, in contrast to the embodiment of FIGS. 13 and 14 wherein the extension 52 is offset relative to the main body part of the portion 35. The edge portions 49 are disposed along the circumferentially directed edges of the portion 35 and extend continuously along the extension 52, thus providing axially directed extension portions 60 which extend on respective sides of the root or base portion of the corresponding finger 25.

In the embodiment shown in FIGS. 19 and 20, hook-like lugs 54 on the portion 35, more precisely on the radial extension 52 thereof, at the inner peripheral edge of the portion 24, extend over the radially extending lug 38 of the portion 35, which fits hook-like around the outer peripheral edge of the portion 24.

The embodiment shown in FIGS. 21 and 22 is in some respects similar to that shown in FIGS. 8 through 10, except that the radial extension 40 is crimped only radially over the adjacent face of the peripheral portion 24. However, along the outer peripheral edge of the portion 24, the portion 35 also carries an extension 44 which is also crimped radially, thus forming a deformation 45, onto the above-mentioned face of the portion 24.

In practice, the resilient loading of the diaphragm 22 of the drive pulley 10A is higher than that of the diaphragm 22 of the driven pulley 10B in such a way that, when the transmission assembly is at rest and as shown in FIG. 1, the movable plate 13 of the drive pulley 10A is urged into a rest position in which it is axially close to the associated fixed plate 14. On the other hand, bearing in mind the equilibrium condition necessarily assumed by the belt 12 between the two pulleys 10A and 10B by virtue of its constant length, in the rest position of the assembly shown in FIG. 1, the movable plate 13 of the driven pulley 10B will have a rest position in which it is axially remote from the associated fixed plate 14, this being against the action of the resilient return means formed by the diaphragm 22 of the pulley 10B.

In operation of the device, when the shaft 16A of the pulley 10A is driven in rotation by any suitable drive means (not shown), the effect of centrifugal force to which the diaphragm 22 of the drive pulley 10A is subjected causes the diaphragm 22 to assume a configuration which increasingly approaches a flat condition, in proportion to the increase in rotary speed of the shaft 16A. In this way, the movable plate 13 of the drive pulley 10A moves away from the fixed plate 14 of the pulley, against the force of the resilient diaphragm 22. Thus, the belt 12 assumes a fresh equilibrium condition between the side plates 13 and 14 of the drive pulley 10A, the belt 12 thus riding in the groove between the plates 13 and 14 at a radially inwardly displaced position. This therefore permits the belt to ride outwardly on the pulley 10B which accordingly permits the movable plate 13 of the pulley 10B to move towards the fixed plate 14, by a distance which is concomitant with the distance by which the movable plate 13 of the drive pulley 10A moves away from its fixed plate 14.

The above-mentioned changes in the positions of the respective side plates 13 and 14 cause a change in the transmission ratio between the input shaft 16A and the output pulley 20. This arrangement is known per se and will not be described in greater detail hereinafter.

It will simply be emphasised that the circumferential contact between each diaphragm 22 and the movable plate 13 to which it is applied occurs by way of the radially extending and thus circumferentially facing edges of the blocks 34 carried by the diaphragm, in a region of the peripheral portion 24 at which the relative pivoting movement as between the peripheral portion 24 and the movable plate 15, upon axial displacement of the side plate 13, is advantageously at a minimum.

In the foregoing described pulley constructions, the blocks 34 not only provide for centering the diaphragm 22 with respect to the associated movable plate 13, but also they provide for transmission of the rotary drive between the movable plate 13 and the diaphragm 22.

In the embodiment shown in FIGS. 23 and 24 however, the blocks 34 on the other hand provide only for centering the diaphragm 22 with respect to the associated movable plate 13, and transmission of the rotary drive between the movable pate 13, and the diaphragm 22, is effected independently of the blocks 34 carried thereby. For example, looking at the drive pulley 10B of FIG. 23, at least the end portion of the shaft 16B is of a transverse section which is polygonal, for example being square as shown in particular in FIG. 24. Similarly, the bush 18B carrying the movable plate 13 of this pulley is of a complementary transverse polygonal section. The side plate 13 is thus non-rotatably engaged relative to the shaft.

Each side plate 13 and 14 is fixed with respect to the associated member 15 and 18 respectively, by any suitable means, for example adhesive, welding, brazing or press-fitting.

A pulley and a device as described above can be used for example for controlling any driven accessory in a motor vehicle such as an alternator, water pump or fan although many other uses will be possible for such a pulley and device.

It will be appreciated that the present invention is not limited to the embodiments described and illustrated but includes any alternative forms thereof and/or any combinations of their various components.

What is claimed is:

1. A speed change pulley comprising: two oppositely and coaxially disposed side plates each providing an inclined side surface thereby defining a tapered belt-receiving groove, one side plate being axially fixed and the other side plate being mounted for axial movement relative to the fixed side plate; a resilient return means engaging said movable side plate for movement thereof and comprising a diaphragm, the diaphragm including a peripheral portion providing a resilient Belleville washer type structure which bears against said movable side plate, and a central portion divided into a plurality of radially extending fingers; an abutment member which is axially fixed with respect to said fixed side plate and against which said diaphragm fingers bear; and engagement means on said diaphragm co-operating with complementary opening means in the movable side plate, comprising at least one engagement member which is a component formed separately from the diaphragm and fitted thereon.

2. A pulley as set forth in claim 1 wherein said engagement member comprises an engagement plate portion which projects axially from a face of said diaphragm and into said opening means.

3. A pulley as set forth in claim 2 wherein said plate portion extends radially completely across said peripheral portion of said diaphragm.

4. A pulley as set forth in claim 3 wherein at the outer peripheral edge of said peripheral portion said engagement plate portion includes a radially extending lug portion which is reversely turned in a hook-like configuration around said outer peripheral edge, and the lug portion bears axially against the opposite face of said peripheral portion.

5. A pulley as set forth in claim 4 wherein said lug portion is divided into two fingers at least at said opposite face.

6. A pulley as set forth in claim 5 wherein said fingers are interconnected at their free ends by a bridge portion which extends circumferentially between said fingers and is in one piece therewith.

7. A pulley as set forth in claim 3 wherein at the outer peripheral edge of said peripheral portion said engagement plate portion is substantially aligned with said outer peripheral edge.

8. A pulley as set forth in claim 3 wherein at the outer peripheral edge of said peripheral portion said engagement plate portion comprise an axially extending portion which bears radially inwardly against said outer peripheral edge.

9. A pulley as set forth in claim 8 wherein said axially extending portion has a radially inwardly directed part axially against the opposite face of said peripheral portion.

10. A pulley as set forth in claim 3 wherein at the inner peripheral edge of said peripheral portion said engagement plate portion has a radially extending lug portion which is reversely turned in a hook-like configuration around said inner edge, and the lug portion bears axially against the opposite face of said peripheral portion.

11. A pulley as set forth in claim 10 wherein said lug portion is divided into two fingers at said opposite face.

12. A pulley as set forth in claim 3 wherein at the inner peripheral edge of said peripheral portion said engagement plate portion comprises a radially inwardly extending portion engaged axially between two adjacent ones of said fingers of said diaphragm.

13. A pulley as set forth in claim 12 wherein said radially extending portion has a radially outwardly directed part crimped axially against the opposite face of said peripheral portion.

14. A pulley as set forth in claim 12 wherein said radially extending portion has at least one end circumferentially crimped about one of said two fingers of the diaphragm.

15. A pulley as set forth in claim 3 wherein at the inner peripheral edge of said peripheral portion said engagement plate portion comprises a radially inwardly extending portion having circumferentially directed edges carrying lug portions which extend circumferentially in a hook-like configuration towards each other around the corresponding circumferentially directed edges of a respective one of said fingers of said diaphragm.

16. A pulley as set forth in claim 15 wherein at the outer peripheral edge of said peripheral portion said engagement plate portion is extended radially by a lug portion which is reversely turned radially in a hook-like configuration around said outer peripheral edge, whereby the lug portion axially bears against the opposite face of said peripheral portion and wherein on said opposite face of the diaphragm said circumferentially extending lug portions extend transversely over said radially extending lug portion.

17. A pulley as set forth in claim 3 wherein said engagement plate portion is relatively thick and bears over its entire radial dimension against the adjacent face of said peripheral portion.

18. A pulley as set forth in claim 3 wherein said engagement plate portion is relatively thin and, at least in respect to a portion of its radial dimension, is spaced axially from the adjacent face of said peripheral portion, said spaced portion carrying edge portions which extend axially perpendicularly to the body part of said spaced portion and radially along circumferentially directed edges of said spaced portion.

19. A pulley as set forth in claim 1 wherein said engagement member is disposed in radial alignment with an opening in said diaphragm by a said slot therein.

20. A pulley as set forth in claim 1 wherein said engagement member is disposed in radial alignment with a said finger of said diaphragm.

21. A pulley as set forth in claim 1 wherein said engagement member is adapted to provide for centering of said diaphragm relative to said movable side plate and also for transmission of the rotary drive between said movable side plate and said diaphragm.

22. A pulley as set forth in claim 1 wherein rotary drive of said movable side plate includes means independent of said engagement member carried by said diaphragm.

23. A pulley as set forth in claim 1 wherein said diaphragm carries a plurality of said engagement members.

24. A pulley as set forth in claim 23 wherein said plurality of engagement members are substantially uniformly distributed over the periphery of said diaphragm.

25. A pulley as set forth in claim 1 wherein said fixed side plate is fixed on a support member and wherein said abutment member is an annular member which is mounted on said support member by a spline-like connection which fixes the support member and said annular member against relative rotation therebetween, the annular member comprising a material which is harder than the material of the support member and the inner peripheral surface of said annular member being a toothlike configuration whereby when said annular member is press-fitted on and said annular member forms grooves of said spline-like connection in the peripheral surface of said support member.

26. A belt-type speed change device comprising first and second pulleys and a drive belt extending around said pulleys, at least one of said pulleys comprising: two oppositely and coaxially disposed side plates each providing an inclined side surface thereby defining a tapered belt-receiving groove, one side plate being axially fixed and the other side plate being mounted for axial movement relative to the fixed side plate; a resilient return means engaging said movable side plate for movement thereof and comprising a diaphragm, the diaphragm including a peripheral portion providing a resilient Belleville washer type structure which bears against said movable side plate, and a central portion divided into a plurality of radially extending fingers; an abutment member which is axially fixed with respect to said fixed side plate and against which said diaphragm fingers bear; and engagement means on said diaphragm co-operating with complementary opening means of the movable side plate, comprising at least one axially projecting engagement member which is a component formed separately from the diaphragm and fitted thereon.

* * * * *